US009654191B2

(12) United States Patent
Sundberg et al.

(10) Patent No.: US 9,654,191 B2
(45) Date of Patent: *May 16, 2017

(54) ASSIGNMENT OF RADIO RESOURCES TO BE USED ON UPLINK TRANSMISSIONS IN A MULTI-USER MULTIPLE INPUT MULTIPLE OUTPUT (MU-MIMO) COMMUNICATION SYSTEM

(71) Applicant: TELEFONAKTIEBOLAGET L M ERICSSON (PUBL), Stockholm (SE)

(72) Inventors: Mårten Sundberg, Årsta (SE); Olof Liberg, Stockholm (SE); Xun Qiu, Solna (SE); Nicklas Johansson, Brokind (SE); John Walter Diachina, Garner, NC (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 197 days.

This patent is subject to a terminal disclaimer.

(21) Appl. No.: 14/528,808

(22) Filed: Oct. 30, 2014

(65) Prior Publication Data
US 2015/0117371 A1    Apr. 30, 2015

Related U.S. Application Data

(60) Provisional application No. 61/898,284, filed on Oct. 31, 2013, provisional application No. 61/898,296, filed on Oct. 31, 2013.

(51) Int. Cl.
*H04W 72/04* (2009.01)
*H04B 7/0452* (2017.01)
(Continued)

(52) U.S. Cl.
CPC ......... *H04B 7/0452* (2013.01); *H04B 7/0417* (2013.01); *H04B 7/0632* (2013.01); *H04W 72/042* (2013.01); *H04W 72/1289* (2013.01)

(58) Field of Classification Search
CPC ... H04L 5/0053; H04L 1/0026; H04L 1/0003; H04L 1/1671; H04L 5/001; H04L 5/0055;
(Continued)

(56) References Cited

U.S. PATENT DOCUMENTS 6,996,083 B1 * 2/2006 Balachandran ...... H04B 7/2643
370/337
7,006,477 B1 * 2/2006 Balachandran ...... H04B 7/2659
370/337
(Continued)

FOREIGN PATENT DOCUMENTS

WO    WO 2012/112106 A1    8/2012
WO    WO 2013/085446 A1    6/2013

OTHER PUBLICATIONS

Huawei Technologies Co., Ltd: "Multiplexing Radio Blocks in the Uplink—Performance Evaluation". 3GPP TSG GERAN #59. GP-130782. Aug. 2013. Sofia, Bulgaria, the whole document.
(Continued)

*Primary Examiner* — Chi H Pham
*Assistant Examiner* — Sai Aung

(57) ABSTRACT

An access point and method are described herein for interacting with a mobile station and assigning radio resources (e.g., multiple USFs, multiple TSCs, multiple MCSs, multiple PC levels) at least a portion of which are to be used for upcoming uplink transmissions by the mobile station to the access point. In addition, a mobile station and method are described for interacting with an access point and receiving therefrom assigned radio resources (e.g., multiple USFs, multiple TSCs, multiple MCSs, multiple PC levels) at least a portion of which are to be used for upcoming uplink transmissions to the access point.

20 Claims, 5 Drawing Sheets

(51) Int. Cl.
*H04B 7/0417* (2017.01)
*H04B 7/06* (2006.01)
*H04W 72/12* (2009.01)

(58) Field of Classification Search
CPC ..... H04L 1/0027; H04L 1/003; H04L 5/0007;
H04L 5/0048; H04L 5/003; H04L 5/0035;
H04W 72/042; H04W 24/10; H04W
72/04; H04W 72/085; H04W 88/08;
H04W 72/1284
See application file for complete search history.

(56) References Cited

U.S. PATENT DOCUMENTS

| | | | |
|---|---|---|---|
| 8,464,127 B2* | 6/2013 | Kim | H03M 13/6306 714/748 |
| 8,582,592 B2* | 11/2013 | Gorokhov | H04L 1/0026 370/329 |
| 8,897,271 B2* | 11/2014 | Bergstrom | H04W 72/1289 370/336 |
| 2007/0049218 A1 | 3/2007 | Gorokhov et al. | |
| 2007/0249401 A1 | 10/2007 | Kim et al. | |
| 2009/0010212 A1* | 1/2009 | Lintulampi | H04W 72/04 370/329 |
| 2009/0034462 A1* | 2/2009 | Kalden | H04L 29/06 370/329 |
| 2009/0257449 A1 | 10/2009 | Chen et al. | |
| 2010/0232374 A1* | 9/2010 | Ofuji | H04J 13/00 370/329 |
| 2010/0238910 A1 | 9/2010 | Conway et al. | |
| 2011/0032839 A1 | 2/2011 | Chen et al. | |
| 2011/0116428 A1 | 5/2011 | Seong et al. | |
| 2011/0142147 A1 | 6/2011 | Chen et al. | |
| 2011/0263278 A1 | 10/2011 | Riddle et al. | |
| 2012/0033592 A1 | 2/2012 | Kim et al. | |
| 2012/0051332 A1 | 3/2012 | Hole et al. | |
| 2012/0051337 A1* | 3/2012 | Hole | H04W 72/1257 370/337 |
| 2012/0213209 A1 | 8/2012 | Bergström et al. | |
| 2013/0155973 A1 | 6/2013 | Geirhofer et al. | |
| 2013/0195008 A1 | 8/2013 | Pelletier et al. | |

OTHER PUBLICATIONS

Huawei Technologies Co., Ltd: "New Work Item on Multiplexing Radio Blocks in the Uplink". 3GPP TSG GERAN Meeting #59. GP-130783. 2013. Sofia, Bulgaria, the whole document.

Huawei Technologies, et al.: "Multiplexing Radio Blocks in the Uplink—Concept Description". 3GPP TSG GERAN #59. GP-130781. Aug. 2013. Sofia, Bulgaria, the whole document.

Huawei Technologies, et al.: "New Study Item on UL MU-MIMO". 3GPP TSG GERAN Meeting #60. GP-131033 (update of GP-131001). Nov. 2013. Zhuhai, P.R. China, the whole document.

Telefon AB LM Ericsson, et al.: "Fast Feedback Channel". 3GPP TSG GERAN #43. Tdoc GP-091325. Vancouver, Canada, the whole document.

Huawei Technologies Co. Ltd.: "Continued Discussion on Supporting DTX for Conversational Services". 3GPP TSG GERAN #42. Tdoc GP-090647. May 2009. Shenzhen, China, the whole document.

Nokia Siemens Networks, et al.: New Study Item on Downlink MIMO (update of GP-130282). 3GPP TSG GERAN Meeting #57. GP-130288. 2013. Vienna, Austria, the whole document.

Huawei Technologies Co. Ltd.: "Impacts of MIMO on Legacy Mobiles". 3GPP TSG GERAN #57. GP-130103. Mar. 2013. Vienna, Austria, the whole document.

Samsung, et al.: "Multiplexing multiple MTC devices in a single block period". 3GPP GERAN WG2#51. GP-111214. Aug. 30-Sep. 1, 2011. Goteborg, Sweden, the whole document.

Telefon AB LM Ericsson, et al.: "New Work Item on New Training Sequence Codes for GERAN". 3GPP TSG GERAN Meeting #60. GP-131042. Nov. 18-22, 2013. Zhuhai, P.R. China, the whole document.

Telefon AB LM Ericsson, et al.: "On SCPIR for MIMO". 3GPP TSG GERAN #58. GP-130469. May 13-17, 2013. Xiamen, P.R. China, the whole document.

$3^{rd}$ Generation Partnership Project; Technical Specification Group GSM/EDGE Radio Access Network; MIMO for Downlink (Release 12). 3GPP TR 45.abc v0.0.1 (May 2013) GP130484, the whole document.

Nsn, et al.: "Downlink MIMO—RLC/MAC Protocol Aspects". 3GPP TSG GERAN #60. GP-130984. Nov. 18-22, 2013. Zhuhai, P.R. China, the whole document.

* cited by examiner

ASSIGNMENT OF RADIO RESOURCES TO BE USED ON UPLINK TRANSMISSIONS IN A MULTI-USER MULTIPLE INPUT MULTIPLE OUTPUT (MU-MIMO) COMMUNICATION SYSTEM

CLAIM OF PRIORITY

This application claims the benefit of priority to U.S. Provisional Application No. 61/898,284, filed on Oct. 31, 2013, and further claims the benefit of priority to U.S. Provisional Application No. 61/898,296, filed on Oct. 31, 2013. The entire contents of each of these applications are hereby incorporated herein by reference for all purposes.

RELATED APPLICATION

This application is related to the co-assigned U.S. patent application Ser. No. 14/528,842 entitled "Assignment of Radio Resources to be used on Downlink Transmissions in a Multiple Input Multiple Output (MIMO) Communication System". The contents of this document are hereby incorporated herein by reference for all purposes.

TECHNICAL FIELD

The present disclosure relates in general to the wireless telecommunications field and, in particular, to at least the following: (1) an access point and method for interacting with a mobile station and assigning radio resources (e.g., multiple USFs, multiple TSCs, multiple MCSs, multiple PC levels, multiple USF granularities) at least a portion of which are to be used for upcoming uplink transmissions by the mobile station to the access point; and (2) a mobile station and method for interacting with an access point and receiving therefrom assigned radio resources (e.g., multiple USFs, multiple TSCs, multiple MCSs, multiple PC levels, multiple USF granularities) at least a portion of which are to be used for upcoming uplink transmissions to the access point.

BACKGROUND

The following abbreviations are herewith defined, at least some of which are referred to within the following description of the prior art and the present invention.
BSS Base Station Subsystem
CRC Cyclic Redundancy Check
DL Downlink
EDGE Enhanced Data rates for GSM Evolution
EGPRS Enhanced General Packet Radio Service
GPRS General Packet Radio Service
GSM Global System for Mobile Communications
KBPS Kilo-Bits Per Second
MCS Modulation and Coding Scheme
MIMO Multiple Input Multiple Output
MS Mobile Station
MU Multi-User
PACCH Packet Associated Control Channel
PC Power Control
PDCH Packet Data Channel
PTCCH Packet Timing Advance Control Channel
RLC Radio Link Control
SU Single User
TBF Temporary Block Flow
TFI Temporary Flow Identity
TS Time Slot
TSC Training Sequence Code
UL Uplink
USF Uplink State Flag In the wireless telecommunications field, the traditional communication MIMO system is generally referred to as a single-user MIMO system (SU-MIMO) and the use of the SU-MIMO technology has led to the emergence of a new communication system referred to as a multi-user MIMO system (MU-MIMO). In the case of SU-MIMO, the access point (base station) communicates with only one mobile station (the user) while both the access point and the mobile station are commonly equipped with multiple antennas. In the case of MU-MIMO, the access point is able to communicate with two or more mobile stations (the users). Although the MU-MIMO technology works relatively well there are still problems that need to be addressed. For instance, if MU-MIMO were to be deployed in a GSM/EDGE system then the current link adaptation and power control (PC) related functionalities performed by the access point to assign radio resources which are to be used by the mobile station for upcoming UL transmissions to the access point would not be sufficient to effectively operate in MU-MIMO mode. The present invention addresses this problem and other problems which are associated with the existing UL MU-MIMO technology.

SUMMARY

An access point, a mobile station, and various methods which address the aforementioned problem and other problems associated with the existing UL MU-MIMO technology are described in the independent claims. Advantageous embodiments of the access point, mobile station, and various methods are further described in the dependent claims.

In one aspect, the present invention provides an access point which is configured to interact with a mobile station. The access point comprises at least one processor, and at least one memory that stores processor-executable instructions, wherein the at least one processor interfaces with the at least one memory to execute the processor-executable instructions, whereby the access point is operable to perform an assign operation and a transmit operation. In the assign operation, the access point at the start of a Temporary Block Flow (TBF) assigns radio resources at least of portion of which are to be used for upcoming UL transmissions by the mobile station. The assigned radio resources comprise at least multiple USFs and possibly corresponding multiple TSCs and/or multiple MCSs and/or multiple PC levels and/or multiple USF granularities. In the transmit operation, the access point transmits an assignment message indicating the assigned radio resources to the mobile station. The access point by operating in this manner and pre-allocating a multitude of radio resource configuration parameters effectively minimizes the need for signaling control overhead to the mobile station which will result in a more efficient utilization of the UL spectrum for user plane transmissions from the mobile station.

In another aspect, the present invention provides a method in an access point for interacting with a mobile station. The method comprising an assigning operation and a transmitting operation. In the assigning operation, the access point at the start of a Temporary Block Flow (TBF) assigns radio resources at least of portion of which are to be used for upcoming UL transmissions by the mobile station. The assigned radio resources comprise at least multiple USFs and possibly corresponding multiple TSCs and/or multiple MCSs and/or multiple PC levels and/or multiple USF granularities. In the transmitting operation, the access point transmits an assignment message indicating the assigned radio resources to the mobile station. The method by operating in this manner and pre-allocating a multitude of radio resource configuration parameters effectively minimizes the need for signaling control overhead to the mobile station which will result in a more efficient utilization of the UL spectrum for user plane transmissions from the mobile station.

In yet another aspect, the present invention provides a mobile station which is configured to interact with an access point. The mobile station comprises at least one processor, and at least one memory that stores processor-executable instructions, wherein the at least one processor interfaces with the at least one memory to execute the processor-executable instructions, whereby the mobile station is operable to perform a receive operation and a store operation. In the receive operation, the mobile station receives an assignment message from the access point where the assignment message indicates radio resources at least a portion of which are to be used by the mobile station for upcoming UL transmissions to the access point. The assigned radio resources comprise at least multiple USFs and possibly corresponding multiple TSCs and/or multiple MCSs and/or multiple PC levels and/or multiple USF granularities. In the store operation, the mobile station stores the assigned radio resources. The mobile station by operating in this manner and utilizing the pre-allocated radio resource configuration parameters will result in a more efficient utilization of the UL spectrum for user plane transmissions to the access point.

In still yet another aspect, the present invention provides a method in a mobile station for interacting with an access point. The method comprises a receiving operation and a storing operation. In the receiving operation, the mobile station receives an assignment message from the access point where the assignment message indicates radio resources at least a portion of which are to be used by the mobile station for upcoming UL transmissions to the access point. The assigned radio resources comprise at least multiple USFs and possibly corresponding multiple TSCs and/or multiple MCSs and/or multiple PC levels and/or multiple USF granularities. In the storing operation, the mobile station stores the assigned radio resources. The method by operating in this manner and utilizing the pre-allocated radio resource configuration parameters will result in a more efficient utilization of the UL spectrum for user plane transmissions to the access point.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
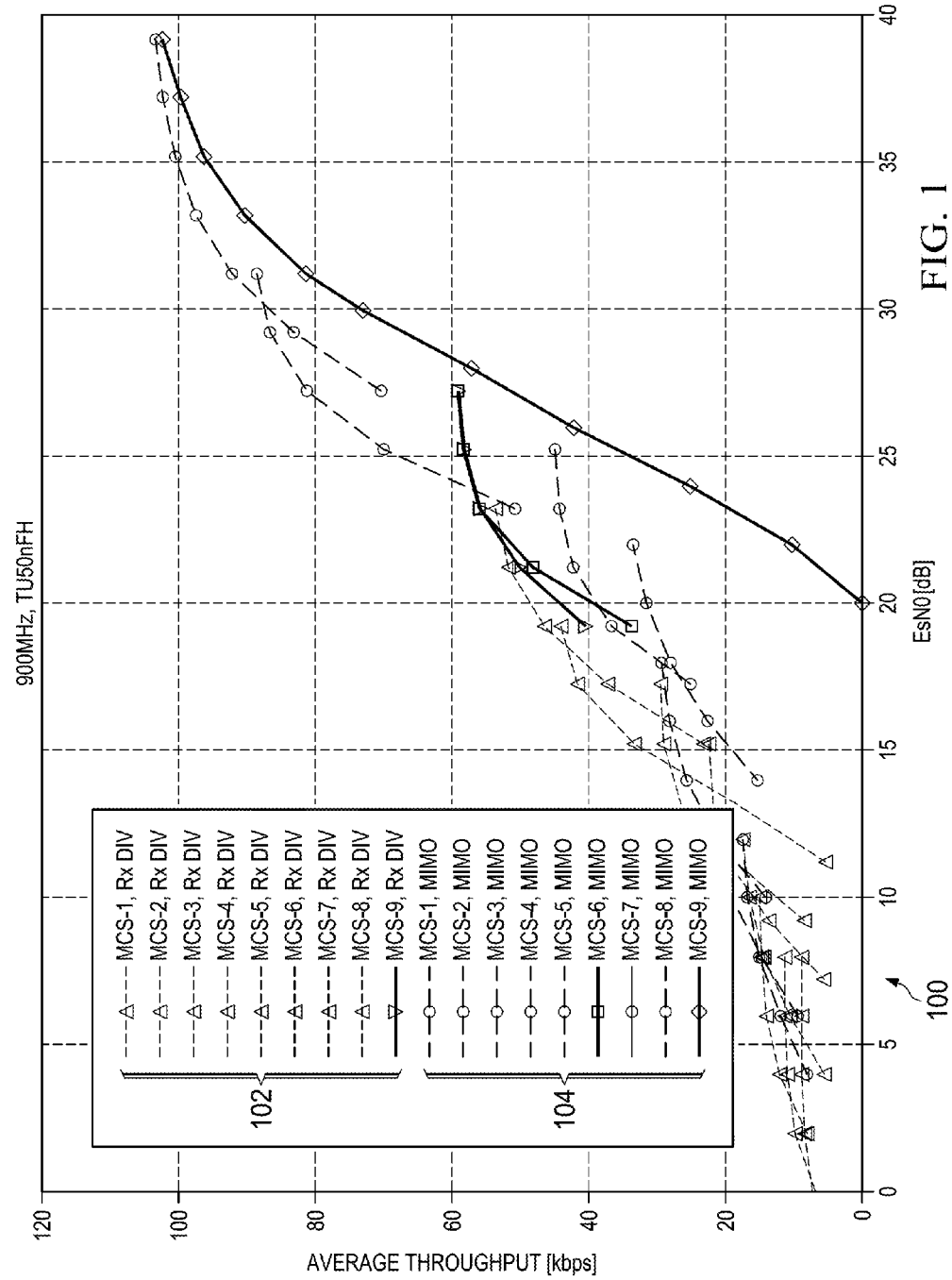
FIG. 1 is a graph used to explain how an access point can select the proper MCS when pairing mobile stations.
Figure 2:
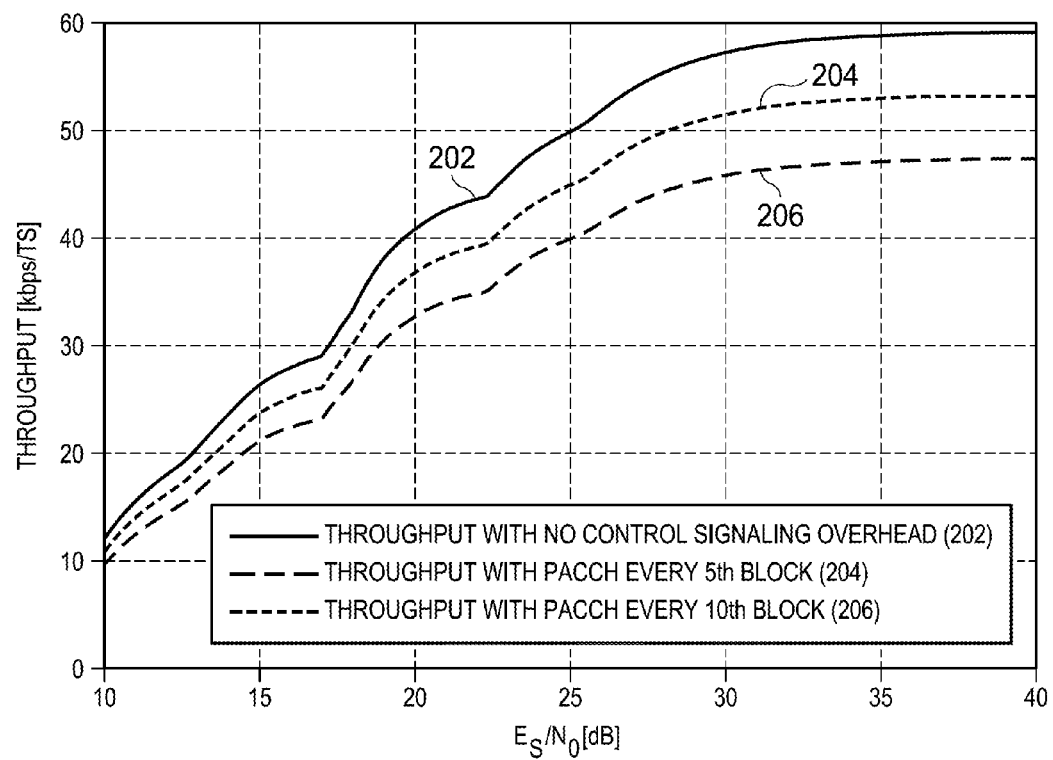
FIG. 2 is a graph which shows the impact on throughput (kbps) if no control signaling overhead is used and if PACCH based control signaling is used but with different frequencies of PACCH transmissions.
Figure 3:
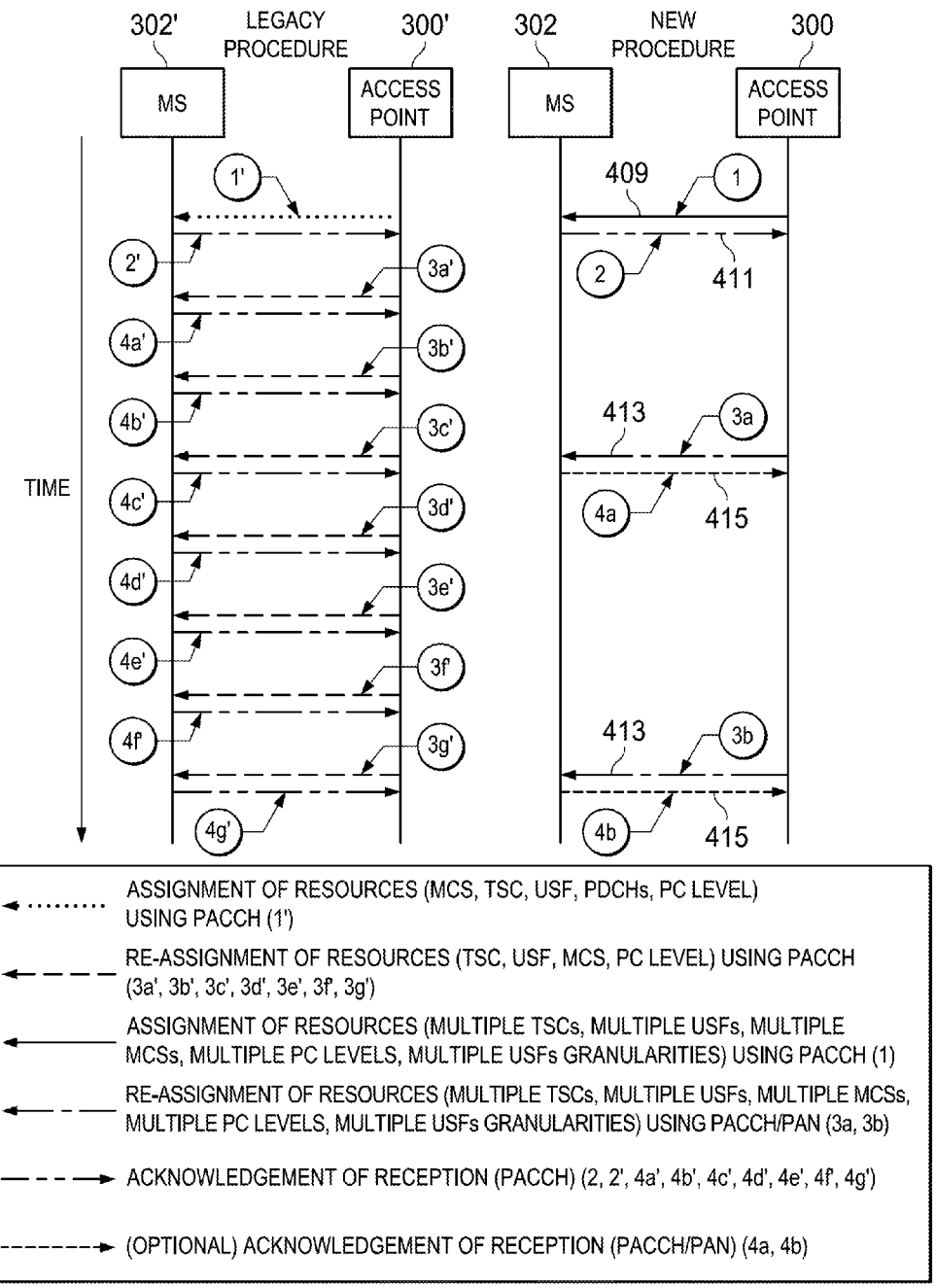
FIG. 3 is diagram which shows a high level overview of the implications of the different control signaling procedures between a legacy access point and a legacy mobile station when compared to an access point and a mobile station which are configured in accordance with an embodiment of the present invention.
Figure 4:
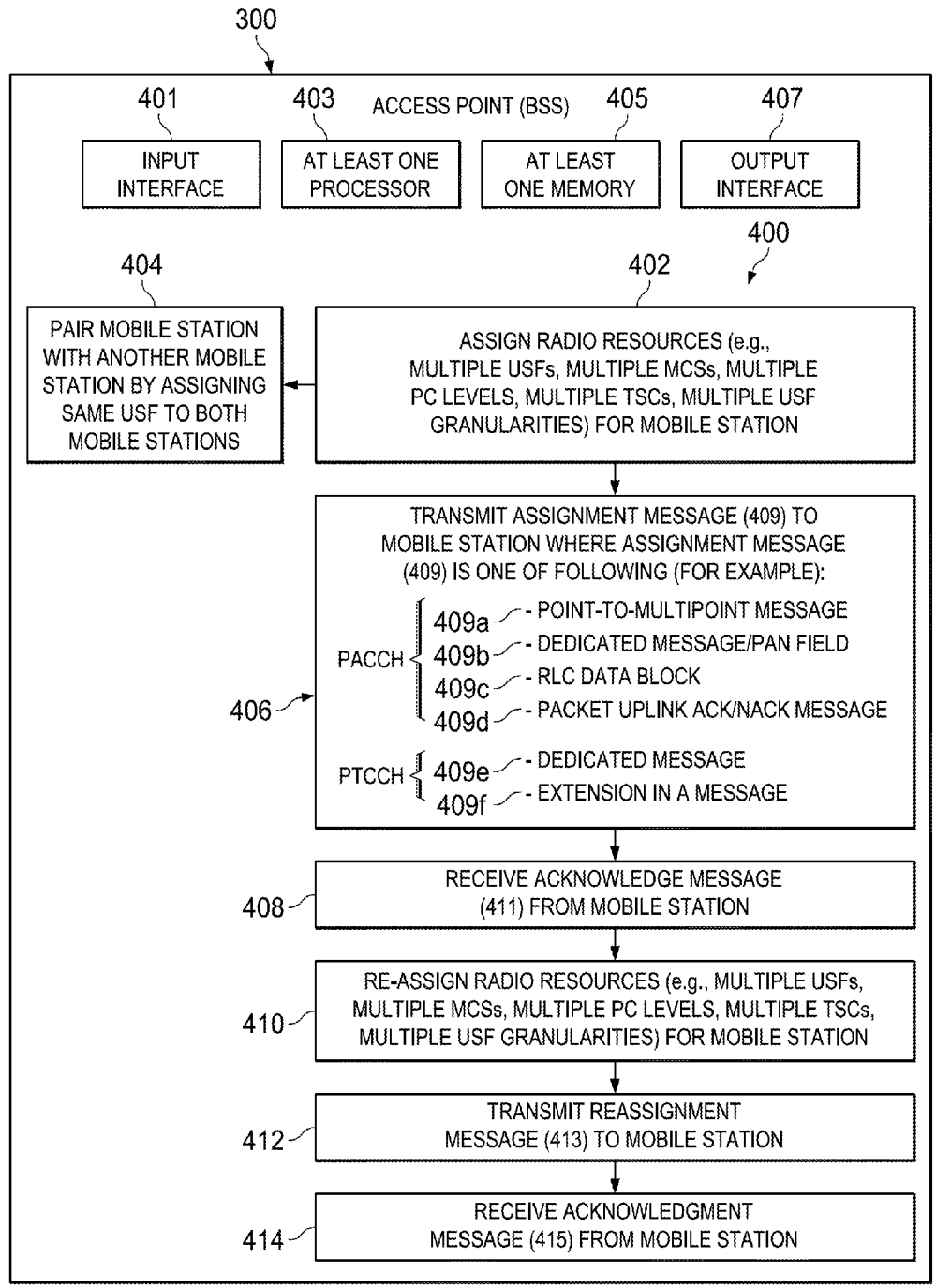
FIG. 4 is a diagram of an exemplary access point which is configured to interact with a mobile station and implement a method in accordance with an embodiment of the present invention.
Figure 5:
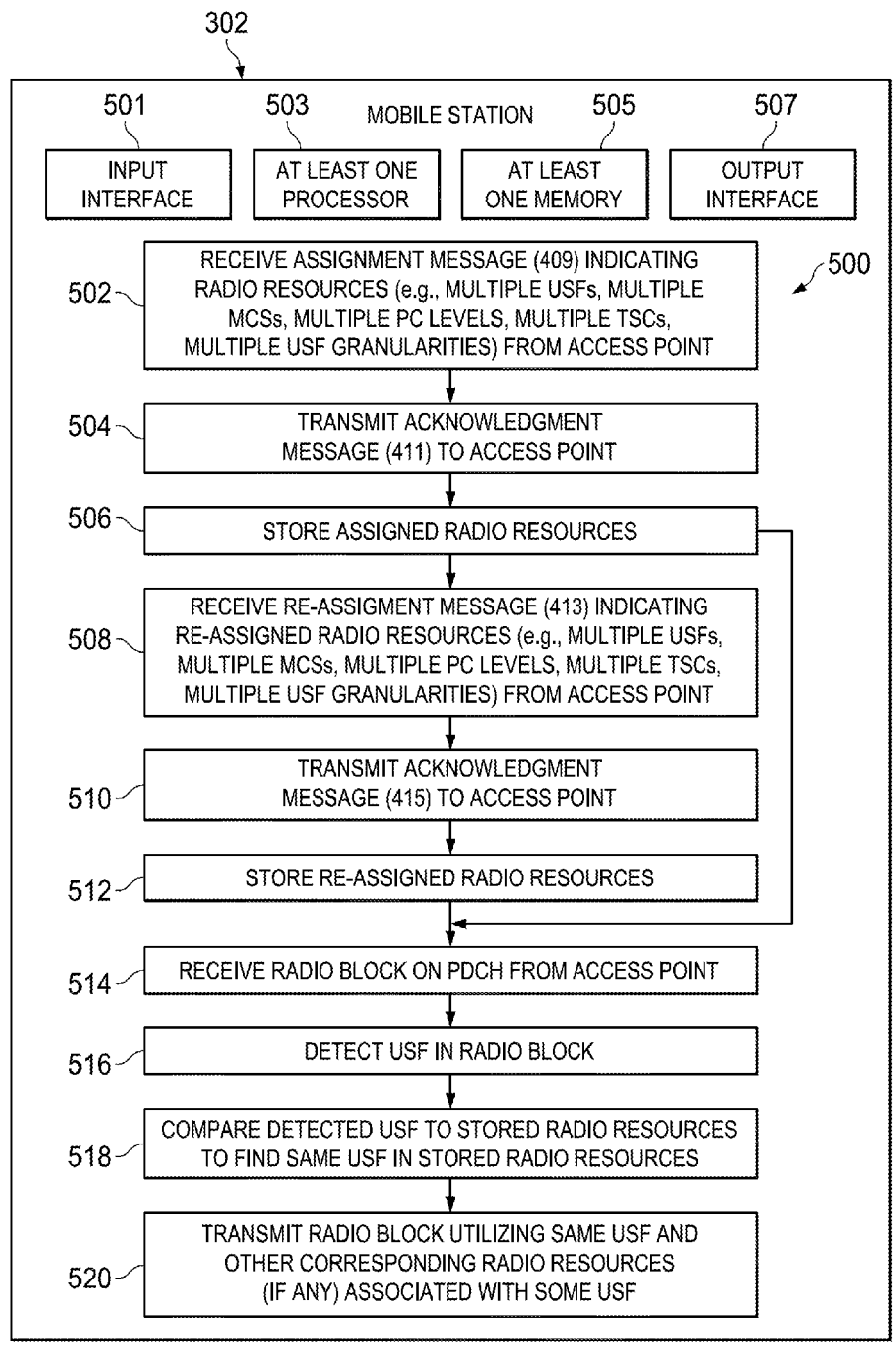
FIG. 5 is a diagram of an exemplary mobile station which is configured to interact with an access point and implement a method in accordance with an embodiment of the present invention.

To describe the technical features of the present invention, a detailed discussion is provided first with respect to FIGS. 1-3 to explain problems associated with the existing UL MU-MIMO technology, and how the access point 300 and the mobile station 302 of the present invention effectively address these UL MU-MIMO problems. Thereafter, a detailed discussion with respect to FIGS. 4-5 is provided to explain in more detail the access point 300 and the mobile station 302 and the associated methods 400 and 500 performed by these devices in accordance with different embodiments of the present invention.

UL MU-MIMO Technology

To implement the UL MU-MIMO technology, the access point (e.g., BSS) should satisfy two requirements: (1) efficiently perform the control plane signaling required to manage the UL power level and link adaptation (choice of MCS) of the mobile station (i.e., assign UL power level and MCS then send to the mobile station to be used in upcoming UL transmission), and (2) dynamically schedule mobile stations for UL pairing. The primary requirement for the control plane signaling is that it has to be sufficiently responsive (i.e. sufficiently "in time") to accommodate the need to make real time adjustments based on the behavior of the mobile station and the dynamic nature of the radio interface while at the same time not requiring an excessive amount of bandwidth to make these adjustments. In other words, some amount of control plane signaling on the PACCH (for example) from the access point to the mobile station will always be necessary but it must be viewed in light of the overarching goal of maximizing the PDCH utilization whereby user plane transmissions are to be emphasized as they provide the revenue bearing potential of a wireless network. The access point 300 and mobile station 302 of the present invention effectively address these requirements as discussed in detail below.

UL Power Levels

In UL MU-MIMO different mobile stations are paired by sharing a common USF value or by using a polling strategy which allows the mobile stations to transmit during the same UL radio block period. In addition, it is important for the access point (e.g., BSS) to ensure in a MU-MIMO scenario that the signals received from the different mobile stations are not separated in power by a level that the access point's receiver cannot handle. Ideally the received signal strength should be similar or at least not separated by more than "A" dB between the mobile stations (where "A" can be dependent on several factors, such as receiver type, modulation used etc . . . ).

Further, when the access point changes between a non-MIMO transmission mode scenario where only one mobile station is transmitting data and a MU-MIMO transmission mode scenario where multiple mobile stations are transmitting data and the mobile station pairing is changed dynamically, there will be a need to dynamically adjust the power control level(s) and MCS(s) of the mobile station(s) depending on the different transmission and pairing opportunities. It should be noted that power control is typically not used in a non-MIMO transmission mode but instead a high power level is used in order to maximize the throughput of the mobile station. It is assumed that in an UL MU-MIMO scenario the mobile stations need not to be aware that they are assigned a channel that is shared with other mobile station(s).

However, the dynamically changing of the power levels of paired mobile stations to cater for UL MU-MIMO and switching between transmission modes by the access point today requires frequent PACCH based signaling that introduces a significant overhead cost to the data transmission (i.e. user plane transmissions will be substantially reduced), effectively lowering the possible overall increased spectral efficiency achieved by the UL MU-MIMO technique. The access point 300 and mobile station 302 of the present invention effectively address these particular problems as discussed in detail below.

Link Adaptation

Similar to managing the power levels the access point will choose the optimum MCS for each transmission mode and power level to be used by a mobile station. For example, if there is a single mobile station assigned an uplink radio block (no other mobile station is scheduled on the same resource) it will typically use a high power level (to maximize throughput) and an MCS that was selected by the access point based only on external interference. If a second mobile station is added and simultaneously transmits during the same UL radio block then both the power control level and the MCS choice applicable for each mobile station might have to be adapted by the access point to accommodate the intra-cell co-channel interference that is introduced by the pairing of the mobile stations onto the same radio resource Referring to FIG. 1, there is shown an exemplary graph 100 where the optimal performance (average throughput [kbps]) is derived by taking the maximum value of each set of curves (the first set 102 and the second set 104) at each Es/N0 point to obtain the optimal performance (average throughput [kbps]) when using receive diversity (the first set 102 which corresponds to single stream transmission) and MIMO transmission (the second set 104 which corresponds to dual stream transmission). For example, assume that mobile station X is currently not paired with another MS (i.e. receive diversity is used) and experiences Es/N0=22 dB. In this case, the optimum MCS for mobile station X according to graph 100 is MCS-9 which is associated with the first set 102. Now assume that the access point pairs mobile station X with mobile station Y. As shown in graph 100, this will not change the experienced Es/N0 but will imply that it is MIMO transmission (second set 104) and thus the optimum MCS choice for mobile station X is now MCS-6 (given that the received signal strengths of the two mobile stations X and Y are close). If this change of MCS is not commanded fast enough by the access point to mobile station X then mobile station X will continue using MCS-9 with the consequence of achieving an average throughput of around 10 kpbs instead of 55 kbps which would be possible if MCS-6 would have been used. Similarly, prior to being paired with mobile station X, mobile station Y may have been paired with a different mobile station Z (for example). As such, mobile station Y may need a change of MCS due to the changed pairing condition along with a change of USF that is performed fast enough by the access point to ensure it does not remain paired with mobile station Z for a significant period of time where it for example may experience degraded throughput performance. In fact, a prime reason for the access point to assign the mobile station X and Y pairing in the first place is because the radio performance may have started to degrade significantly to the point where UL MU-MIMO was no longer suitable for the mobile station Y and Z pairing. The access point 300 of the present invention effectively ensures that these changes in MCS, pairings etc . . . are commanded in a manner that is faster than in the past as discussed in detail below.

USF Assignment

In the current GSM/EDGE system it is only possible for the access point to assign a single unique USF value to a mobile station on a specific assigned PDCH (physical resource). A mobile station can be assigned multiple PDCHs, but on a specific PDCH resource only a single USF value can be assigned. The USF value is used by the mobile station to determine if the access point has scheduled the mobile station for an UL transmission opportunity. In other words, if the mobile station detects its assigned USF in a radio block that is received on the downlink of a given PDCH, then the mobile station can respond by transmitting a radio block in the next transmission opportunity on the UL which corresponds to the downlink resource in which the USF was received. The problem with a single USF assignment is that in a MU-MIMO multiplexing scenario where multiple mobile stations (multiple users) share the same USF value and therefore share the same uplink physical resource (PDCH) there might be a need to dynamically adjust which two mobile stations share a common USF (and therefore PDCH) due to the changing radio environment. However, there is currently no way for the access point to use control plane signaling to dynamically manage the pairing of different mobile stations which would require indicating the appropriate PC level, MCS, USF, TSC etc. . . . to each of the mobile stations in the pairing without using an excessive amount of bandwidth or control signaling overhead (note: the TSC is used by the access point to facilitate synchronization and channel estimation of UL transmissions from each mobile station). The access point 300 and mobile station 302 of the present invention effectively address this particular problem as discussed in detail below.

Control Signaling Overhead

For the access point to dynamically signal to the mobile station which MCS and/or power control level and/or USF and/or TSC and/or USF granularity to use in an upcoming UL transmission will consume control signaling overhead. If legacy operation is used by the access point and the control signaling is done via the logical PACCH channel then a full radio block will be consumed to, for example, command the mobile station to use a specific MCS. This is not efficient. FIG. 2 illustrates an exemplary graph 200 which shows the impact on throughput if no control signaling overhead (line 202) is used or if PACCH based signaling is used with a different frequency of the PACCH transmission, namely the throughput if the PACCH based signaling occurs every $5^{th}$ radio block (line 204) and the throughput if the PACCH based signaling occurs every $10^{th}$ radio block (line 206). It can be seen that the highest throughput is (naturally) achieved when there is no control signaling overhead, and that there can be substantial gains in throughput by minimizing the amount of control signaling used. As discussed below, the access point 300 and mobile station 302 of the present invention are configured to reduce the control signaling overhead especially when compared to the legacy access point and mobile station.

Legacy procedure vs. New Procedure

Embodiments of the present invention introduce a way for the access point 300 (e.g., BSS 300) to provide flexible UL scheduling to support both single stream and multi-user dual stream transmissions by assigning a multiplicity of USF and UL TSC values to the mobile station 302. The mobile station 302 only has to attempt detecting any of its assigned USF values and act as instructed by the network. The mobile station 302 need not know that it is paired with other mobile station(s) 302 which use the same resources. In addition to this, the access point 300 is also configured to assign MCS and Power Control configurations for each USF and TSC combination.

Referring to FIG. 3, there is diagram which shows a high level overview of the implications of the different control signaling procedures between a legacy access point 300' and legacy mobile station 302' when compared to the access point 300 and mobile station 302 of the present invention. With respect to the legacy access point 300' and legacy mobile station 302' the following exemplary control signaling may occur: (1) the legacy access point 300' uses the PACCH to transmit the assignment of radio resources (e.g., one USF, one TSC, one MCS, one PC level) to the legacy mobile station 302' (see numeral 1'—assignment message); (2) the legacy mobile station 302' transmits on the PACCH an acknowledgment of the reception of the assigned radio resources to the legacy access point 300' (see numeral 2'—acknowledgment message); (3) the legacy access point 300' if needed transmits on the PACCH the re-assignment of radio resources (one USF, one TSC, one MCS, one PC level) to the legacy mobile station 302' (see numerals 3a', 3b', 3c', 3d', 3e', 3f' and 3g'—seven legacy re-assignment messages shown in this example); and (4) the legacy mobile station 302 transmits on the PACCH an acknowledgment of the reception of the re-assigned radio resources to the legacy access point 300' (see numerals 4a', 4b', 4c', 4d', 4e', 4f' and 4g'—seven acknowledgment messages shown in this example). As for timing, the legacy access point 300' transmits the assignment of radio resources to the legacy mobile station 302' at the start of a Temporary Block Flow (TBF). Thereafter, the legacy access point 300' transmits if needed the one or more re-assignments of radio resources to the legacy mobile station 302' while the TBF is ongoing.

In contrast, with respect to the access point 300 and mobile station 302 of the present invention the following exemplary control signaling may occur: (1) the access point 300 uses the PACCH to transmit the assignment of radio resources (e.g., multiple USFs, multiple TSCs, multiple MCSs, multiple PC levels, multiple USF granularities) to the mobile station 302 (see numeral 1—assignment message 409); (2) the mobile station 302 transmits on the PACCH an acknowledgment of the reception of the assigned radio resources to the access point 300 (see numeral 2—acknowledgment message); (3) the access point 300 if needed transmits on the PACCH (or PAN) the re-assignment of radio resources (multiple USFs, multiple TSCs, multiple MCSs, multiple PC levels, multiple USF granularities) to the mobile station 302 (see numerals 3a and 3b—two re-assignment messages 413 shown in this example); and (4) the mobile station 302 optionally transmits on the PACCH (or PAN) an acknowledgment of the reception of the re-assigned radio resources to the access point 300 (see numerals 4a and 4b—two acknowledgment messages shown in this example). As for timing, the access point 300 transmits the assignment of radio resources to the mobile station 302 at the start of a TBF. Thereafter, the access point 300 transmits if needed the one or more re-assignments of radio resources to the mobile station 302 while the TBF is ongoing.

In the new procedure, the access point 300 can use a variety of different signaling schemes to transmit the assigned (or re-assigned) radio resources (e.g., multiple USFs, multiple TSCs, multiple MCSs, multiple PC levels, multiple USF granularities) to the mobile station 302. Several different exemplary signaling schemes are as follows:

A. A point-to-multipoint message 409a can be used in which multiple mobile stations 302 which are assigned the same UL radio resource are instructed on power levels and/or MCSs and/or USFs and/or UL TSCs and/or USF granularities to be used. The point-to-multipoint message would be implemented using the already existing logical channel PACCH, or in a newly defined logical channel defined for a point-to-multi point communication.

B. A dedicated message 409b with a Piggy-backed Ack/Nack (PAN) field (or a variation thereof) can be used to signal to a single mobile station 302 which power levels and/or MCSs and/or USFs and/or UL TSCs and/or USF granularities to use in upcoming UL transmissions. This DL PAN field or a variation of the existing PAN space can be treated as a Mini-PACCH wherein the 20 payload bits of the current PAN are formatted in a new manner to support this new functionality.

(i) Multiple instances of such dedicated messages sent using a Mini-PACCH can be sent using different DL radio blocks and thereby notify multiple mobile stations 302 wherein each mobile station 302 is uniquely identified via (a) the 5 bit TFI XORed into the PAN space CRC (already existing in the current specifications in legacy operation) and (b) additional information XORed into other bits of the PAN space CRC (e.g. an extended TFI value). The uniquely addressed mobile station 302 would then know the specific power controls and/or MCSs and/or USFs and/or UL TSCs and/or USF granularities it has been assigned by the access point 300 to use for UL transmissions.

(ii) The Mini-PACCH has the advantage of being fast (i.e. real time) while at the same time still allowing the DL radio block in which it is sent to carry a RLC data block (i.e. user plane payload) and thereby minimizing the impact on PDCH utilization.

(iii) The need for a mobile station 302 to acknowledge reception of a Mini-PACCH based dedicated message on the DL can be indicated by using a flag within the dedicated message itself. In one example, if an acknowledgement is requested then it can be sent by the mobile station 302 using a Mini-PACCH on the UL which will be available for each USF based UL transmission scheduled for that mobile station 302. An acknowledged reception is useful for the access point 300 to understand that the mobile station 302 is aware of its new assigned USF which can help avoid confusion and collision of transmissions on the UL. For instance, if the mobile station 302 has not received the dedicated message sent using the Mini-PACCH then it would from the perspective of the access point 300 still respond to its "old" USF value, which if not known may lead to confusion and collision of transmissions in the UL.

C. A dedicated message in which a reserved (currently unused) value(s) of the length indicator in the GPRS and EGPRS RLC data block 409c can be used to indicate to a single mobile station 302 on which power levels or MCSs to use in an upcoming UL transmission. A reserved value could be mapped to a given coding scheme, e.g., a given reserved length indicator could be mapped to MCS-2 and another reserved length indicator to MCS-3 etc . . . The reserved value(s) of the length indicator could also be used to signal that the first x bytes of the RLC data block immediately following a given reserved value contain control information for the setting of power levels and/or coding schemes. It can be noted that also USFs and/or TSCs and/or USF granularities to be used can be signaled with this approach. However, the robustness of this signaling, with an estimated error rate of 10-30% can result in a potential complication of network operation if the message is not received and multiple mobile stations 302 use the same TSC.

D. An extension field to the Packet Uplink Ack/Nack message 409d can be used where the USFs and/or TSCs and/or power levels and/or MCSs and/or USF granularities are signaled to the mobile station 302.

E. A dedicated message 409e on the PTCCH can be used, or an extension in a message 409f on the current PTCCH channel can be used to transmit USFs and/or TSCs and/or power levels and/or MCSs and/or USF granularities to the mobile station 302.

In the legacy procedure, the legacy access point 300' assigns one USF, one TSC, one MCS, and one PC level for the legacy mobile station 302' at the start of the TBF, and subsequent re-assignments of the radio resources also involves the assignment of one USF, one TSC, one MCS, and one PC level during the ongoing TBF. In the legacy case, all the control blocks (numerals 1', 3a', 3b', 3c', 3d', 3e', 3f and 3g') occupy a full radio block and the legacy mobile station 302' will acknowledge all received control blocks by a corresponding acknowledgement (numerals 2', 4a', 4b', 4c', 4d', 4e', 4f and 4g') each of which also occupy a full radio block. In contrast, in the new procedure the access point 300 can assign multiple USFs, multiple TSCs, multiple MCSs, multiple PC levels, and multiple USF granularities for the mobile station 302 at the start of the TBF, and subsequent re-assignments of the radio resources can also involve the assignment of multiple USFs, multiple TSCs, multiple MCSs, multiple PC levels, and multiple USF assignments during the ongoing TBF. The result of using the new procedure when compared to the legacy procedure is that less signaling needs to be used in the remainder of the ongoing TBF to modify the current assignments for the USF, TSC, MCS, PC and USF granularity parameters. A more detailed discussion about the new procedure and some of the advantages associated therewith is provided next.

If the new procedure is used then the first assignment message 409 and any subsequent re-assignment message(s) 413 if any will contain information for the mobile station 302 to construct (store) a "table" indicating how to behave (in terms of what power level, MCS and UL TSC to use) when receiving a specific USF value in a radio block which is received in the PDCH and that specific USF is within the set of its previously assigned USF values. The table would be updated each time a new re-assignment message 413 is received. An example of a table can be seen in TABLE #1 as follows.

TABLE #1

| USF | Power Control Level | MCS | UL TSC |
|-----|---------------------|-------|--------|
| 2   | P0                  | MCS-9 | 3      |
| 7   | P2                  | MCS-7 | 3      |
| 10  | P1                  | MCS-8 | 4      |
| 15  | P0                  | MCS-4 | 3      |

Note:
USF granularity is not used in this example.

For example, if the mobile station 302 detects a USF=10 in a radio block that is received on the PDCH then the mobile station 302 knows that it shall use power control level P1, MCS-8 and TSC4 when sending an UL transmission to the access point 300.

In a re-assignment message 413 the access point 300 (network) can either instruct the mobile station 302 to: (i) keep a USF specific configuration and associated assigned radio resources; (ii) change a USF specific configuration and associated assigned radio resources; (iii) remove a USF specific configuration and associated assigned radio resources. For example, if the mobile station 302 based on the first assignment message 409 constructs a table with the corresponding information for USF 2, 7, 10, 15 (see TABLE #1) then in the re-assignment message 413 it receives information for USFs 2, 7, 20, 27, it will modify the table to support configurations for USF 2, 7, 10, 15, 20, 27 unless the access point 300 explicitly indicates that the USF 10 and/or the USF 15 specific configuration is to be removed from the table. If the USF 10 and USF 15 specific configurations are kept, then after receiving the re-assignment message 413 the mobile station 302 will update the power control level, the MCS and the UL TSC for USF 2 and 7 (according to the re-assignment message 413), add the USF 20 and USF 27 specific configurations (including their corresponding power control level, MCS and UL TSC) to the table, and keep the USF 10 and USF 15 configurations unchanged.

The access point 300 in turn would keep track of each USF value that was assigned to each mobile station 302 in order to effectively schedule the resources on the UL. The access point 300 would also keep track of the UL TSC assignment when decoding the scheduled UL streams received from a mobile station 302. This enables the access point 300 to choose freely between pairing a certain mobile station 302 with another mobile station 302 and not pairing it with another mobile station 302 for any given UL radio block period.

An example of the access point 300 pairing mobile stations 302 for a given UL radio block period is discussed next with respect to TABLES #2-3. In TABLE #2, the corresponding "table" for a specific mobile station 302, in this case mobile station X, in the access point 300 (at the network side) is as follows:

TABLE #2

| Shared USF | User stream 1 | User stream 2 | UL TSC stream 1 | UL TSC stream 2 |
|------------|---------------|---------------|-----------------|-----------------|
| 2          | MS X          | MS Y          | 3               | 4               |
| 7          | MS X          | MS Z          | 3               | 4               |
| 10         | MS X          | MS W          | 4               | 3               |
| 15         | MS X          | Not occupied  | 3               | N/A             |

The access point 300 can freely choose in this example among mobile stations Y, Z and W to pair with mobile station X by assigning them the same USF, in this case, either USF 2, 7 or 10. The access point 300 does not have to signal the chosen pairing to the paired mobile stations X, Y, Z or W because the access point 300 has previously assigned multiple USFs and associated MCSs, TSCs, PC levels to each of the mobile stations X, Y, W and Z. It can also be seen that by assigning USF=15 to mobile station X then no pairing of another mobile station Y, Z and W with mobile station X will be triggered when USF 15 is used and as such mobile station X will be the only mobile station transmitting on these resources if USF=15 is detected in received radio block on PDCH.

It should be noted that assigning each mobile station 302 a multiplicity of USF values will put more strain on the USF space available. However, there already exists solutions to alleviate this problem, see for example the co-assigned WO 2012/112106 wherein the content of which is hereby incorporated herein by reference. It can further be noted that the MCS and PC parameter value space as currently defined are not impacted even though the USF space may be significantly expanded. This is because both the MCS and PC level used have no relation to the other mobile stations 302 (users) in the cell, but are user specific (i.e. the same range of the power control, and the same number of MCSs still apply and there is no conflict in multiple mobile stations 302 using for example the same MCS). The TSC parameter value space will only experience strain depending on the number of TSCs used in the cell As mentioned above, there might be a need to re-assign USFs and/or, power control levels, and/or MCSs, and/or TSCs (as seen in FIG. 3 where several control messages (re-assignment message 413) are transmitted during an ongoing data transfer (ongoing TBF)). What can trigger such a re-assignment of radio resources is typically dependent on the network conditions. If assuming for example the same mobile stations 302 are kept in the system (as at the time of initial assignment), and each mobile station 302 is, by an assignment of multiple USFs, paired with all other mobile stations 302, there might be no need to re-assign the USF values because all relations between all mobile stations 302 are already pre-defined. However, the MCS and power control levels might have to be re-assigned to address varying radio conditions. The variation in MCS, power control level, and TSC can however be alleviated by assigning multiple USF values to the two mobile stations 302 in a UL MU-MIMO pairing. This is exemplified in TABLE #3 where TABLE #2 has been extended to include multiple entries of the same pair of mobile stations X and Y. By combining this with TABLE #1 one can see that for mobile station X receiving USF 2 and USF 7 the difference is that the MCS and power control level is changed. From a network perspective, this is a way to cater for a change in the radio environment while keeping the same mobile station pairing without having to send any additional control signaling that would otherwise have to be used to modify the MCS and/or power control level for one mobile station of a given pairing.

TABLE #3

| Shared USF | User stream 1 | User stream 2 | UL TSC stream 1 | UL TSC stream 2 |
| --- | --- | --- | --- | --- |
| 2 | MS X | MS Y | 3 | 4 |
| 7 | MS X | MS Y | 3 | 4 |
| 10 | MS X | MS W | 4 | 3 |
| 15 | MS X | Not occupied | 3 | 4 |

It should be noted that in the case of UL MU-MIMO when a USF is being re-assigned due to a new pairing of mobile stations 302 this sometimes implies also that the UL TSC (training sequence code) needs to be re-assigned. The UL training sequence codes of the multiplicity of mobile stations 302 paired on the same UL packet TS should be as orthogonal as possible to avoid inter-cell co-channel interference. The set of two or more paired mobile stations 302 should not be assigned the same UL TSC since this will result in confusion at the receiver of the access point 302 as to which mobile station's 302 UL transmissions have been received, and the effective performance will be severely degraded. As an example, assume MS X and MS Y are paired, and MS X is assigned UL TSC3 and MS Y UL TSC5. The network decides that a more effective use of the available packet TS is to instead pair MS X with MS Z. However, MS Z is already assigned UL TSC3 and thus in order to avoid that both MS X and MS Z in the new pairing use UL TSC3, one of the UL TSCs used by MS X and MS Z needs to be re-assigned. The present invention enables this re-assignment.

Referring to FIG. 4, there is a diagram of an exemplary access point 300 which is configured to interact with a mobile station 302 and implement a method 400 in accordance with an embodiment of the present invention. As shown, the access point 300 includes an input interface 401, at least one processor 403, at least one memory 405, and an output interface 407. The access point 300 includes many other components which are well known in the art but for clarity the well known components are not described herein. The access point 300 functions wherein the at least one processor 403 interfaces with the at least one memory 405 to execute processor-executable instructions stored therein whereby the access point 300 is operable to implement the various steps of the method 400 as discussed next. Beginning at step 402, the access point 300 is operable at the start of a TBF with the mobile station 302 to assign radio resources at least of portion of which are to be used for upcoming UL transmissions by the mobile station 302 (note: a discussion is provided below with respect to FIG. 5 to explain how the mobile station 302 uses the assigned radio resources for UL transmissions). As discussed above, the assigned radio resources can comprise multiple USFs, multiple MCSs, multiple PC levels, multiple TSCs and multiple USF granularities (i.e., number of UL radio blocks which are allowed to transmitted when scheduled). In particular, each assigned USF has at least a corresponding MCS, PC level, TSC and/or USF granularity. Furthermore, the access point 300 while performing step 402 can effectively pair the mobile station 302 (mobile station X) with another mobile station 302 (mobile station Y) for a given UL radio block period by assigning the same USF to both mobile stations 302 (mobile stations X and Y) (step 404). This pairing of mobile stations 302 provides a more efficient utilization of the spectrum.

At step 406, the access point 300 transmits an assignment message 409 (FIG. 3's numeral 1) which contains the assigned radio resources via the output interface 407 to the mobile station 302. As discussed above, the assignment message 409 can be sent on the PACCH utilizing one of following (for example): (1) a point-to-multipoint message 409a; (2) a dedicated message 409b where a piggy-backed Ack/Nack (PAN) field is used to contain the assigned radio resources; (3) a Radio Link (RLC) data block 409c where a length indicator therein is used to indicate the assigned radio resources; (4) a Packet Uplink Ack/Nack message 409d with an extension field which indicates the assigned radio resources. Furthermore, the assignment message 409 can be sent as a dedicated message 409e on the PTCCH or as an extension in a message 409f on the PTCCH. At step 408 (optional), the access point 300 may receive an acknowledgment message 411 (FIG. 3's numeral 2) via the input interface 403 from the mobile station 302. The acknowledgment message 411 indicates that the mobile station 302 has successfully received the assignment message 409.

At step 410 (optional), the access point 300 depending on the network conditions and while the TBF is ongoing can re-assign the radio resources at least a portion of which are to be used for the upcoming UL transmissions by the mobile station 302. At step 412 (optional), the access point 300 transmits a re-assignment message 413 (FIG. 3's numeral 3a) which contains the re-assigned radio resources via the output interface 407 to the mobile station 302. As discussed above, the re-assignment message 413 contains instructions for the mobile station 302 to perform at least one of the following: (1) keep a specific USF and associated assigned radio resources; (2) change a specific USF and associated assigned radio resources; and (3) remove a specific USF and associated assigned radio resources. At step 414 (optional), the access point 300 may receive an acknowledgment message 415 (FIG. 3's numeral 4a) via the input interface 403 from the mobile station 302. The acknowledgment message 415 indicates that the mobile station 302 has successfully received the re-assignment message 411. As described above, the access point 300 can re-assign the radio resources and send multiple re-assignment messages 413 in sequence during the ongoing TBF to the mobile station 302 (see FIG. 3's numerals 3a and 3b) and then receive multiple acknowledgment messages 415 (see FIG. 3's numerals 4a and 4b) from the mobile station 302.

Referring to FIG. 5, there is a diagram of an exemplary mobile station 302 which is configured to interact with an access point 300 and implement a method 500 in accordance with an embodiment of the present invention. As shown, the mobile station 302 (e.g., mobile phone, tablet, laptop computer, or any device connected to a cellular network, etc . . . ) includes an input interface 501, at least one processor 503, at least one memory 505, and an output interface 507. The mobile station 302 includes many other components which are well known in the art but for clarity the well known components are not described herein. The mobile station 302 functions wherein the at least one processor 503 interfaces with the at least one memory 505 to execute processor-executable instructions stored therein whereby the mobile station 302 is operable to implement the various steps of the method 500 as discussed next. Beginning at step 502, the mobile station 302 receives an assignment message 409 (FIG. 3's numeral 1) via the input interface 501 from the access point 300. The assignment message 409 indicates the radio resources at least a portion of which are to be used by the mobile station 302 for upcoming UL transmissions to the access point 302. As discussed above, the assignment message 409 can be received on the PACCH within one of following (for example): (1) a point-to-multipoint message 409a; (2) a dedicated message 409b where a piggy-backed Ack/Nack (PAN) field is used to contain the assigned radio resources; (3) a Radio Link (RLC) data block 409c where a length indicator therein is used to indicate the assigned radio resources; (4) a Packet Uplink Ack/Nack message 409d with an extension field which indicates the assigned radio resources. Furthermore, the assignment message 409 can be sent as a dedicated message 409e on the PTCCH or as an extension within a message 409f on the PTCCH.

At step 504 (optional), the mobile station 302 may send an acknowledgment message 411 (FIG. 3's numeral 2) via the output interface 507 to the access point 300. The acknowledgment message 411 indicates that the mobile station 302 has successfully received the assignment message 409.

At step 506, the mobile station 302 stores the assigned radio resources within one of the memories 505. As discussed above, the assigned radio resources can comprise multiple USFs, multiple MCSs, multiple PC levels, multiple TSCs and multiple USF granularities. In particular, each assigned USF has at least one of a corresponding MCS, PC level, TSC and/or USF granularity.

After step 506, the mobile station 302 at step 508 (optional) can receive a re-assignment message 413 (FIG. 3's numeral 3a) which contains re-assigned radio resources via the input interface 503 from the access point 300. As discussed above, the re-assignment message 413 contains instructions for the mobile station 302 to perform at least one of the following: (1) keep a specific USF and associated assigned radio resources; (2) change a specific USF and associated assigned radio resources; and (3) remove a specific USF and associated assigned radio resources. At step 510 (optional), the mobile station 302 may transmit an acknowledgment message 415 (FIG. 3's numeral 4a) via the output interface 507 to the access point 300. The acknowledgment message 415 indicates that the mobile station 302 has successfully received the re-assignment message 411. As described above, the mobile station 302 can receive multiple re-assignment messages 413 in sequence during the ongoing TBF from the access point 300 (see FIG. 3's numerals 3a and 3b) and then transmit multiple acknowledgment messages 415 (see FIG. 3's numerals 4a and 4b) to the access point 300. Further, at step 512, the mobile station 302 stores the re-assigned radio resources within one of the memories 505.

In addition, at any time after steps 506 or 512, the mobile station 302 at step 514 can receive a radio block (which contains a USF) on a PDCH via the input interface 501 from the access point 300. At step 516, the mobile station 302 detects the USF contained in the radio block. At step 518, the mobile station 302 compares the detected USF to the stored assigned radio resources to find the same USF in the stored assigned radio resources. At step 520, the mobile station 302 transmits a radio block utilizing the same USF and other assigned radio resources if any which are associated with the same USF via the output interface 507 to the access point 300.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. An access point configured to interact with a mobile station, the access point comprising:
   at least one processor; and,
   at least one memory that stores processor-executable instructions, wherein the at least one processor interfaces with the at least one memory to execute the processor-executable instructions, whereby said access point is operable to:
      assign, at a start of a Temporary Block Flow (TBF), radio resources at least portion of which are to be used for upcoming uplink transmissions by the mobile station, wherein the radio resources comprise at least multiple Uplink State Flags (USFs); and, transmit an assignment message indicating the assigned radio resources to the mobile station transmit, to the mobile station, a radio block on a Packet Data Channel (PDCH), wherein the radio block contains a first USF;

receive, from the mobile station, a radio block utilizing the same first USF and other assigned radio resources if any which are associated with the same first USF.

2. The access point of claim 1, wherein the radio resources further comprises at least one of a Modulation and Coding Scheme (MCS), a Power Control (PC) level, a USF granularity, and a Training Sequence Code (TSC) for each one of the multiple USFs.

3. The access point of claim 1, wherein the access point is further operable to:

re-assign, while the TBF is ongoing, the radio resources at least a portion of which are to be used for the uplink transmissions by the mobile station; and, transmit a re-assignment message indicating the re-assigned radio resources to the mobile station.

4. The access point of claim 3, wherein the re-assignment message contains instructions for the mobile station to perform at least one of the following: (1) keep a specific USF and associated assigned radio resources; (2) change a specific USF and associated assigned radio resources; and (3) remove a specific USF and associated assigned radio resources.

5. The access point of claim 1, wherein the access point is further operable to:

pair the mobile station with another mobile station for a given UL radio block period by assigning the same USF to both the mobile station and the another mobile station.

6. The access point of claim 1, wherein:

the assignment message is sent on a Packet Associated Control Channel (PACCH) utilizing one of following: (1) a point-to-multipoint message; (2) a dedicated message where a piggy-backed Ack/Nack (PAN) field is used to contain the assigned radio resources; (3) a Radio Link (RLC) data block where a length indicator therein is used to indicate the assigned radio resources; (4) a Packet Uplink Ack/Nack message with an extension field which indicates the assigned radio resources; or, the assignment message is sent as a dedicated message on a Packet Timing Advance Control Channel (PTCCH) or as an extension in a message on the PTCCH.

7. A method in an access point for interacting with a mobile station, the method comprising:

assigning, at a start of a Temporary Block Flow (TBF), radio resources at least a portion of which are to be used for upcoming uplink transmissions by the mobile station, wherein the radio resources comprise at least multiple Uplink State Flags (USFs); and, transmitting an assignment message indicating the assigned radio resources to the mobile station transmitting, to the mobile station, a radio block on a Packet Data Channel (PDCH), wherein the radio block contains a first USF;

receiving, from the mobile station, a radio block utilizing the same first USF and other assigned radio resources if any which are associated with the same first USF.

8. The method of claim 7, wherein the radio resources further comprises at least one of a Modulation and Coding Scheme (MCS), a Power Control (PC) level, a USF granularity, and a Training Sequence Code (TSC) for each one of the multiple USFs.

9. The method of claim 7, further comprising:

re-assigning, while the TBF is ongoing, the radio resources at least a portion of which are to be used for the uplink transmissions by the mobile station; and, transmitting, to the mobile station, a re-assignment message indicating the re-assigned radio resources.

10. The method of claim 9, wherein the re-assignment message contains instructions for the mobile station to perform at least one of the following: (1) keep a specific USF and associated assigned radio resources; (2) change a specific USF and associated assigned radio resources; and (3) remove a specific USF and associated assigned radio resources.

11. The method of claim 7, further comprising:

pairing the mobile station with another mobile station for a given UL radio block period by assigning the same USF to both the mobile station and the another mobile station.

12. The method of claim 7, wherein:

the assignment message is sent on a Packet Associated Control Channel (PACCH) utilizing one of following: (1) a point-to-multipoint message; (2) a dedicated message where a piggy-backed Ack/Nack (PAN) field is used to contain the assigned radio resources; (3) a Radio Link (RLC) data block where a length indicator therein is used to indicate the assigned radio resources; (4) a Packet Uplink Ack/Nack message with an extension field which indicates the assigned radio resources; or, the assignment message is sent as a dedicated message on a Packet Timing Advance Control Channel (PTCCH) or as an extension in a message on the PTCCH.

13. A mobile station configured to interact with an access point, the mobile station comprising:

at least one processor; and, at least one memory that stores processor-executable instructions, wherein the at least one processor interfaces with the at least one memory to execute the processor-executable instructions, whereby said mobile station is operable to:

receive, from the access point, an assignment message indicating radio resources at least a portion of which are to be used by the mobile station for upcoming uplink transmissions to the access point, wherein the radio resources comprise at least multiple Uplink State Flags (USFs);

store the assigned radio resources receive, from the access point, a radio block on a Packet Data Channel (PDCH), wherein the radio block contains a USF;

detect the USF contained in the radio block;

compare the detected USF to the stored assigned radio resources to find the same USF in the stored assigned radio resources; and, transmit, to the access point, a radio block utilizing the same USF and other assigned radio resources if any which are associated with the same USF.

14. The mobile station of claim 13, wherein the radio resources further comprises at least one of a Modulation and Coding Scheme (MCS), a Power Control (PC) level, a USF granularity, and a Training Sequence Code (TSC) each one of the multiple USFs.

15. The mobile station of claim 13, wherein the mobile station is further operable to:

receive, from the access point, a re-assignment message indicating re-assigned radio resources at least a portion of which the mobile station is to use on uplink transmissions to the access point; and, store the re-assigned radio resources.

16. The mobile station of claim 15, wherein the re-assignment message contains instructions for the mobile station to perform at least one of the following: (1) keep a specific USF and associated assigned radio resources; (2) change a specific USF and associated assigned radio resources; and (3) remove a specific USF and associated assigned radio resources.

17. A method in a mobile station for interacting with an access point, the method comprising:

receiving, from the access point, an assignment message indicating radio resources at least a portion of which are to be used by the mobile station for upcoming uplink transmissions to the access point, wherein the radio resources comprise at least multiple Uplink State Flags (USFs); and, storing the assigned radio resources receiving, from the access point, a radio block on a Packet Data Channel (PDCH), wherein the radio block contains a USF;

detecting the USF contained in the radio block;

comparing the detected USF to the stored assigned radio resources to find the same USF in the stored assigned radio resources; and, transmiting, to the access point, a radio block utilizing the same USF and other assigned radio resources if any which are associated with the same USF.

18. The method of claim 17, wherein the radio resources further comprises at least one of a Modulation and Coding Scheme (MCS), a Power Control (PC) level, a USF granularity, and a Training Sequence Code (TSC) each one of the multiple USFs.

19. The method of claim 17, further comprising receiving, from the access point, a re-assignment message indicating re-assigned radio resources at least a portion of which are to be used by the mobile station for uplink transmissions to the access point; and, storing the re-assigned radio resources.

20. The method of claim 19, wherein the re-assignment message contains instructions for the mobile station to perform at least one of the following: (1) keep a specific USF and associated assigned radio resources; (2) change a specific USF and associated assigned radio resources; and (3) remove a specific USF and associated assigned radio resources.

* * * * *